Dec. 18, 1928.

A. ECKERT 1,695,420

POTATO PEELER

Filed March 24, 1927

INVENTOR.
Anton Eckert
BY
ATTORNEY

Patented Dec. 18, 1928.

1,695,420

UNITED STATES PATENT OFFICE.

ANTON ECKERT, OF PITTSBURGH, PENNSYLVANIA.

POTATO PEELER.

Application filed March 24, 1927. Serial No. 177,868.

My invention relates to a potato peeler and important objects thereof are to provide a potato peeler which is mechanical in its operation, which will expedite the peeling of potatoes of any size or shape, which is simple in its construction and arrangement, strong, durable and efficient in its use, compact, sanitary, positive in its action, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1:
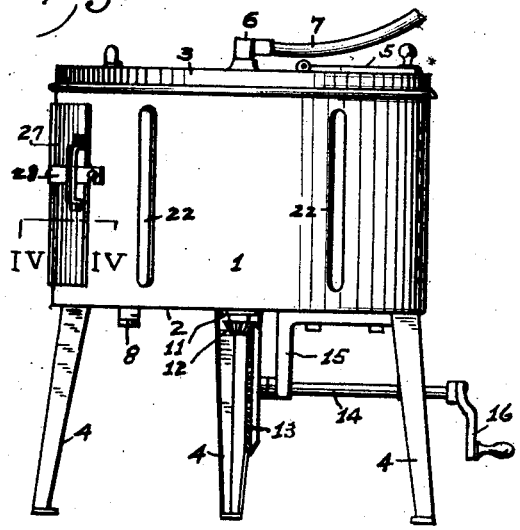
Figure 1 is a side elevational view of a potato peeler constructed in accordance with the invention.
Figure 2:
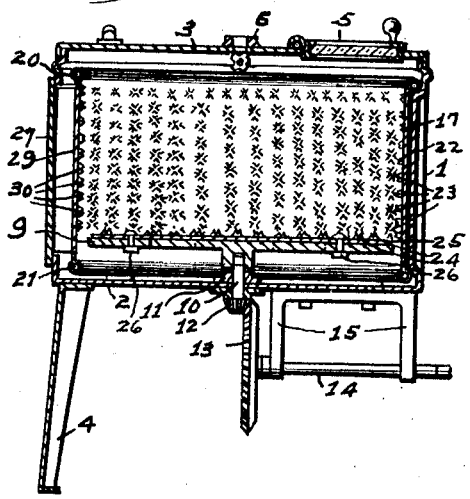
Figure 2 is a vertical sectional view thereof.
Figure 3:
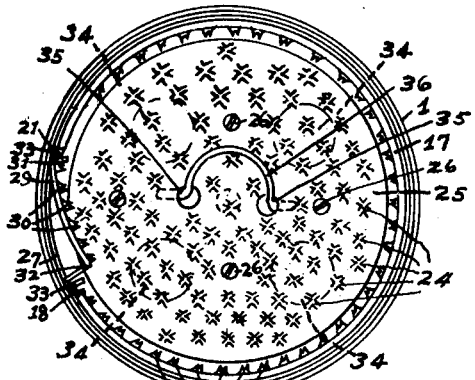
Figure 3 is a top plan view of the device with the cover removed therefrom.

Referring in detail to the drawing 1 denotes a vertically disposed, cylindrical casing including a bottom 2 and provided with a removable cover 3. The casing 1 is supported on the legs 4, which are fixed thereto in any suitable manner.

The cover 3 is provided with a hinged door 5 which embodies a panel of glass or other transparent material to enable the operator to view the peeling operation in the interior of the casing 1 without necessitating the removal of the cover 3 from the latter. The cover 3 is further provided with a hose connection 6 which connects with a hose 7 adapted for attachment to a water faucet supplying a continuous flow of required water through the casing 1 during the peeling operation. The water is discharged from the casing 1 through a drain pipe 8 fixed in the casing bottom 2.

A circular supporting disk 9 is rotatably mounted in the casing 1 adjacent to the bottom 2 of the latter. The supporting disk 9 is detachably supported on a centrally disposed perpendicularly depending spindle 10 to rotate with the latter. The spindle 10 is suitably journaled for rotation in the bearing 11. The latter is fixed in the diametric center of the casing bottom 2.

The lower end of the spindle 10 projects through the bearing 11 and carries a small bevel gear 12. The latter meshes with a comparatively large driving gear 13, which is fixed on the inner end of a horizontally disposed drive shaft 14. The drive shaft 14 is journaled for rotation in suitable bearing brackets 15 which are fixed to the under side of the casing bottom 2. The outer end of the drive shaft 14 is provided with an operating handle 16 for manually operating the device. If the device is to be power driven the handle 16 is replaced with a pulley or gear adapted for connection with a suitable power transmission element. The relative rate of the associated gears 12 and 13 is such as to impart the proper operating rotation to the supporting disk 9 to best meet conditions.

A casing liner or grater cylinder 17 is removably mounted in the casing 1. The grater cylinder 17 is disposed vertically, and is slightly spaced from the inner periphery of the casing 1. The grater cylinder 17 has open ends and is formed with a vertically disposed opening 18 which extends throughout the length thereof. The width of the opening 18 is commensurate to the width of the door opening 19, which is formed in the side wall of the casing 1. When the grater cylinder 17 is mounted in the casing 1, the opening 18 of the former registers with the door opening 19 of the latter.

The upper end of the grater cylinder 17 is re-enforced by an annular wire ring 20, which is disposed on the outer side of the grater cylinder 17 and which is maintained in position by overlapping the same with the marginal top edge of the grater cylinder 17.

The lower end of the grater cylinder 17 is provided with a similarly disposed resilient re-enforcing rod 21. The latter, however, does not extend across the vertically disposed opening 18.

The casing 1 is formed with a plurality of regularly spaced, vertically extending and inwardly impressed ribs 22, which have their ends disposed adjacent to respective ends of the casing 1. When the grater cylinder 17 is mounted in the casing 1, the ribs 22 extend between and engage the re-enforced ends of the casing 1 and prevent the vertical movement of the grater cylinder 17 in the latter during the operation of the device.

As the resilient re-enforcing rod 21 does not extend across the lower end of the spring 18, of the grating cylinder 17, the lower end of the latter can be resiliently compressed to permit of its passage over the inwardly disposed casing ribs 22. The return of the lower end of the grater cylinder 17 to its normal position, after being mounted in the casing 1, as above described will secure the grater cylinder against vertical movement in the casing 1.

The grater cylinder 17 is constructed from sheet metal and has its entire wall area covered with a multiplicity of inwardly disposed indentations, which are positioned in close proximity to each other. These indentations perforate the cylinder 17 and form rough, sharp, grating burrs 23 on the inner side of the latter.

Similarly constructed and arranged grating burrs 24 are formed on the top face of the circular grater disk 25. The latter is detachably mounted and secured on the top of supporting disk 9 by means of screws 26, or in any other suitable manner, to permit and facilitate the removal of the grater disk 25 from the supporting disk 9 for the purposes of cleaning or replacement.

The casing side wall opening 19 is provided with a hinged side door 27. The latter is provided with a latch 28 for securing the same in the closed position. The inside of the side door 27 carries a fixed grater plate 29 covered with grating burrs 30, which are identical to those formed on the grater cylinder 17 and on the grater disk 25.

Figure 4:
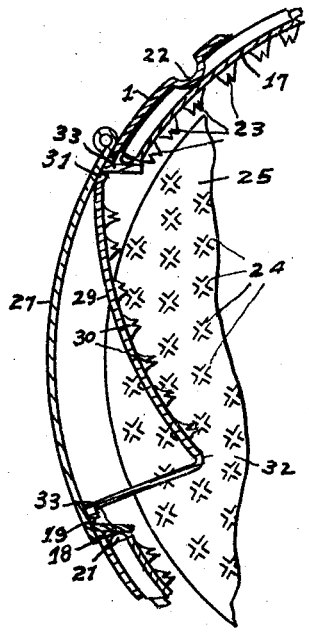
Figure 4 is an enlarged sectional view on line IV—IV, Figure 1.
Figure 5:
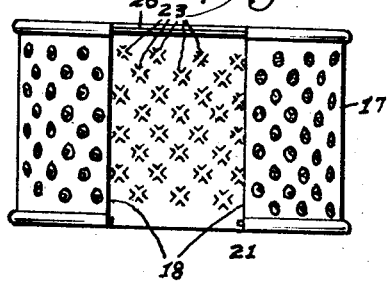
Figure 5 is a side elevational view of the grater cylinder.

The grater plate 29 is inset, or curved inwardly to extend into the casing 1 when the side door 27 is in the closed position. One side edge 31 of the grater plate 29 is disposed on the same circumferential plane as the wall of the grater plate 29, which is disposed forwardly, relatively to the counter clockwise direction of rotation of the supporting disk 9 and of the grater disk 25 secured thereto, extends for a considerable distance into the casing 1, as clearly shown in Figure 4.

A vertically extending flange 33 is fixed to each marginal side edge of the side door 27 on the inner side of the latter. The flange 33 engages respective side edges of the grater cylinder opening 18 when the side door 27 is in the closed position, and prevent circumferential movement of the grater cylinder 17 during the operation of the device.

The supporting disk 9 is formed with a plurality of enlarged openings 34 which provide a passage for removed peelings as the latter are washed through the perforated burrs 24 in the grater disk 25 by the action of the water during the peeling operation.

The supporting disk 9 together with the grater disk 25 provided thereon constitute the rotor of the device, and are formed with a pair of spaced apertures 35, which are adapted for engagement by a detachable, resilient handle 36 to facilitate the release of the rotor from its attachment with the spindle 10 and its removal and replacement from and to the casing 1, for cleaning purposes.

In practice, the operation of the apparatus is as follows: A number of potatoes are placed in casing 1 on the grater disk 25 and in the grater cylinder 17. A continuous flow of water is passed through the casing 1. The water enters the casing 1 through the hose 7, attached in the cover 3, and is discharged through the drain pipe 8, in the casing bottom 2.

The rotation of the rotor is very rapid and the centrifugal force created by such rapid rotation will cause the potatoes to be whirled and rolled in all directions with considerable force against the burred inner side of the grater cylinder 17 and on the burred top face of the grater disk 25. When passing along the inset grater plate 29, the latter will tumble the potatoes to vary their positions so all portions thereof must inevitably contact with the burred sides of the grater cylinder 17, disk 25, and plate 29.

The grating action of the grater elements 17, 25 and 29 upon the rapidly moving potatoes, will remove all peelings from the latter in a most thorough, efficient and economical manner.

The flow of water through the casing 1 will facilitate and expedite the peeling operation, as the water will carry away the removed peelings through the perforated burrs in which such removed peeling would normally tend to lodge.

By opening the casing side door 27 and revolving the rotor, the potatoes may be removed from the casing through the said side door 27 by the centrifugal action imparted to the potatoes by the revolving rotor. Such removal of the potatoes from the casing 1 eliminates the necessity of removing them by hand through the open top of the casing 1.

What I claim is:

1. A vegetable peeler comprising a casing, a grater cylinder mounted therein, a flat, apertured rotatable grater disk positioned within and in proximity to the lower end of said cylinders, and driving means for said disk, said cylinder being split, and a grater plate carried by said casing and extending into said cylinder between the split ends thereof and above said disk.

2. A vegetable peeler comprising a casing, a grater cylinder mounted therein, a flat, apertured rotatable grater disk positioned within and in proximity to the lower end of said cylinders, and driving means for said disk, said cylinder being split, and a curved, horizontally disposed, vertically extending grater plate carried by the casing and extending into said cylinder between the split ends thereof and over said disk.

3. A vegetable peeler comprising a casing, provided with means for circulating water therethrough, a split grater cylinder positioned within the casing, a flat, rotatable horizontally disposed grater disk arranged within the lower portion of the cylinder and provided with spaced openings, driving means for the disk, and a curved, horizontally disposed, vertically extending grater plate projecting into such cylinder, between the split ends thereof and over the disk.

In testimony whereof I affix my signature.

ANTON ECKERT.